Dec. 24, 1957  W. O. KELLEY  2,817,179
RETRACTABLE-HOOK FISH LURE
Filed Jan. 28, 1955

INVENTOR.
WILLIAM O. KELLEY
BY R. W. Hodgson

United States Patent Office 2,817,179
Patented Dec. 24, 1957

2,817,179
RETRACTABLE-HOOK FISH LURE
William O. Kelley, San Bernardino, Calif.

Application January 28, 1955, Serial No. 484,619

7 Claims. (Cl. 43—35)

Generally speaking, the present invention relates to the artificial fish lure art, and more particularly, pertains to an artificial fish lure, closely imitative of a natural fish food, suitable for casting on a fishing line and having a hidably retractable hook.

Although live, or preserved, bait is advantageous to the fisherman, since it is appetizing to the fish and can be used to completely hide the hook, it has the disadvantages of often being inconvenient to obtain, variable in size, easily removable from the hook by the fish, rapidly spoilable and non-reusable. These disadvantages have led to the invention and development of many prior artificial fish lures. Each of these generally included a body imitative of a natural fish food, and a fish-hook is disguised or hidden partially by its association with said body. In some of these devices a mechanical apparatus has been provided by which the fish-hook may be automatically set after the lure has been taken by a fish. However, all such devices, known to me, have suffered from numerous disadvantages. The attempt to disguise the fish-hook to look like a natural part of some bait animal causes loss of verisimilitude of the device. Further, fish often learn by repeated experience (which is purposely given in some hatcheries before the fish are released in the wild) the appearance and the desirability of avoiding a fish hook; and in all such prior devices known to me, the hook proper, and various associated apparatus, are fully visible to the fish. Also, having the hook exposed may lead to snagging of the hook on an object or person when the line is cast, causing possible loss of the lure or personal injury; or may even lead to personal injury as the lure is tied to the line.

Generally speaking, the present invention includes body means, by which internal recess means and a pair of external apertures communicating with said recess means are defined; fish-hook retention means; stop means; and fish-hook means comprising pointed tip means (usually barbed), generally U-shaped shank means having two arms with separate first ends and with second ends connected by a curved portion, said tip means being mounted at the first end of a first of the arms of the U, and fastening means mounted at the first end of the second arm of the U.

Said fish-hook means and said recess means are cooperable with said retention means and said stop means to allow said fish-hook means to be selectively retractably hidden within said recess means and retained therein with only said fastening means (which is usually eye means) projecting externally through a first of said apertures for fastening to a line whereby the entire device may be cast into the water; and to be selectively partially removed from within said recess by a sharp pull on the line after said body means has been swallowed by a fish to allow the exit of said tip means from the second of said apertures and its engagement with the mouth of the fish, but preserving an attached relationship between said body means and said fish-hook means (which remains threaded through the two apertures, the U-shaped shank being retained by a bridge-portion of said body means).

In one preferred general form of the present invention, said stop means consists of the defining wall of said recess means, which is supportingly abuttable against said shank means to properly position said fish-hook means in its hidden position with said fastening means externally projecting (usually said second arm is longer than the first arm). In other forms of the invention said stop means constitutes collar means projecting from said shank means immediately below said fastening means and abuttable against the exterior of said body means. In this form of the invention, said body means may constitute a shell (as, to allow the retention of a scenting material within said shell to attract fish by its gradual escape).

Said retention means usually comprises spring means cooperable with said fish-hook means and the walls defining said recess means and/or said second apertures. In one preferred general form of the present invention, said retention means and said fastening means comprise a doubled portion of the second arm of the shank means (which is usually wire shank means) forming a loop constricted near the end of said second arm to form an eye, the free end being so shaped as to form a projecting spring which contacts one side of said recess means and forces the second shank arm proper against the opposite side of said recess means. Said opposing sides of said recess means are virtually straight in this form of the invention to allow the hook to be easily pulled into its exposed position after said body means is retentively taken by a fish.

Said body means should be constructed of a light material whose specific gravity is comparable with that of living matters. In a preferred form, various synthetic resins may be used.

In one preferred form of the present invention, said body means is shaped and colored in imitation of a salmon egg, which is a food of many fresh-water fish. Being of virtually spherical form, such an artificial egg is simple and inexpensive to manufacture.

In one preferred form of the present invention, the body means may be scented with a substance attractive to fish, such as a salmon-egg-simulating scent, for example.

To use the device of the present invention, the fish-hook is pushed into its hidden position; a leader line is tied to the eye and to the line proper and the line is cast. When a fish has retentively taken the lure, the line is given a sharp pull to expose and set the hook and the fish is played and pulled in.

From the above description of the basic and several preferred forms of the present invention, it will be apparent to those skilled in the art that the hereinbefore-mentioned disadvantages of the prior art are virtually entirely eliminated and overcome in and through the use of the present invention.

For example, until the device of the present invention is swallowed and pulled at by a fish, only enough of the fish-hook need be exposed—that is, the eye—to permit the attachment of a fishing line. Thus, assuming that a transparent leader is used, the device of the present invention will be indistinguishable from natural food to a fish. Furthermore, snagging the hook, with resulting injury to person or property, is nearly impossible when the device is properly used.

With the above points in mind, it is an object of the present invention to provide an artificial fish lure with a retractable hook, attachable to a fishing line and so constructed that a fisherman can induce a fish to swallow the lure and can then expose the hook to catch the fish.

It is a further object of the present invention to provide an artificial fish lure closely imitative of a salmon egg.

It is also an object of the present invention to provide an artificial fish lure which is adapted to obviate the danger of its fish-hook's snagging on a person or object.

Other and allied objects will occur to those skilled in the art after a careful study of the present specification, the accompanying illustrations, and the appended claims.

To facilitate understanding, reference will be made to the hereinbelow-described drawings, in which.

Figure 1:
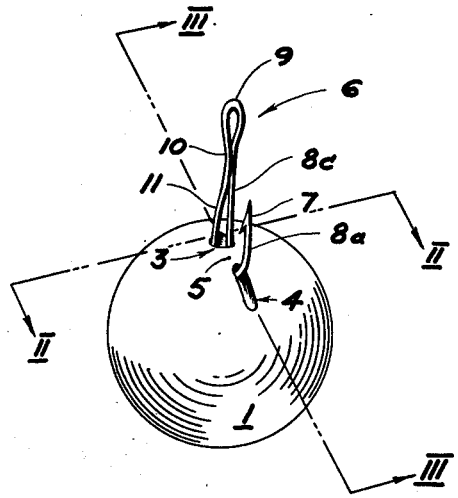
Fig. 1 is a perspective view of a preferred form of the artificial fish lure of the present invention (in the form of a salmon egg) with the fish-hook in exposed position.

Generally speaking, the present invention includes body means defining internal recess means and two apertures communicating said recess means with the exterior of said body means. In the artificial salmon-egg fish lure illustrated in Figs. 1–3, said body means is a synthetic resin, virtually spherical body member imitative of a salmon-egg and is generally indicated at 1. Said recess means is indicated at 2, and said apertures comprise the aforesaid first aperture, indicated at 3, and the aforesaid second aperture indicated at 4. A bridge-portion 5 of the body means 1 lies between said apertures 3 and 4. In this form of the invention, the defining wall 12 of the recess means constitutes fish-hook positioning stop means abuttable against the shank of a fish-hook.

Also, generally speaking, the present invention includes fish-hook means comprising generally U-shaped shank means having first and second arms and a connecting portion (said second arm usually being the longer of two unequal arms), fish-engaging pointed tip means (usually barbed) mounted on the free end of said first arm, and fishing-line fastening means mounted on the free end of said second arm. The present invention also includes retention means cooperable with said fish-hook means and said body means to selectively hold said fish-hook means in hidden position and to allow the release of said fish-hook means, when desired.

In the specific example illustrated, said fish-hook means is indicated generally at 6; said tip means is barbed and is indicated at 7; said first arm 8a, connecting portion 8b and second arm 8c form the generally U-shaped wire shank (lying virtually in a single plane); and at the end of the second arm 8c the wire is doubled back to form a loop lying in a plane virtually perpendicular to that of the U of the shank. The eye 9 at the top of the loop is defined by constriction 10 and constitutes the fastening means, and the free end of the wire is bowed outward at 11 to form a spring which constitutes said retention means through its cooperation with arm 8c and the opposed sides A and B of the recess means 2—the spring 11 and the arm 8c being forcibly engaged by said sides when the fish-hook is in hidden position (best shown in Figs. 2 and 3), but permitting the fish-hook's withdrawal into exposed position (best shown in Fig. 1) when a fishing-line adapted to be attached at 9 (and not shown) is given a sharp tug.

The body means 1 is colored in imitation of a salmon egg by color integral with the plastic or painted on, as desired. Furthermore, scent oils may similarly be incorporated in the plastic or paint, or may be placed in the recess means 2 to gradually escape through the apertures 3 and 4.

Before the lure is used, the fish-hook 6 is pressed into hidden position (Fig. 2 or 3) in the recess means 2, until the shank (usually the curved portion 8b especially) makes abutting contact with the wall 12 of the recess 2, and the retention spring 11 and arm 8c become fully engaged with the sides A and B. Then a line (not shown, for clarity) is tied to eye 9 and the lure is cast. When the lure is retentively taken by a fish, a sharp tug on the line serves to pull the hook 6 out into a position such as that of Fig. 1 whereby to set the barbed tip 7 in the fish. When this occurs, the body means 1 remains on the portion 8b of the shank, being maintained there by bridge 5.

Figure 2:
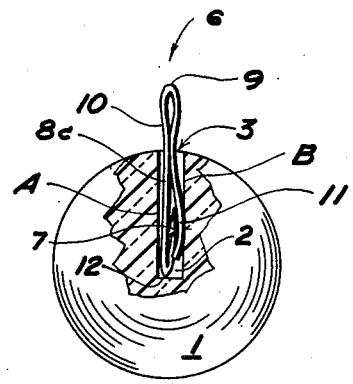
Fig. 2 is a cut-away view (partially in elevation and partially in vertical section) of the device of Fig. 1 as viewed from the position indicated by the line and arrows II—II of Fig. 1, but with the hook in its hidden position.
Figure 3:
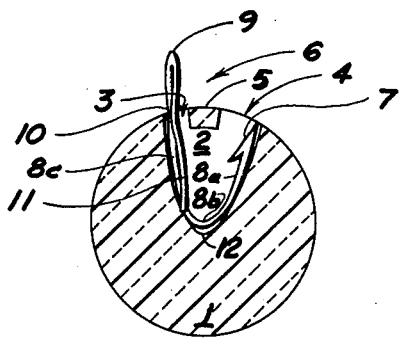
Fig. 3 is a sectional view of the device of Fig. 1, the position and direction of the section being indicated by the line and arrows III—III of Fig. 1, with the hook in hidden position.
Figure 4:
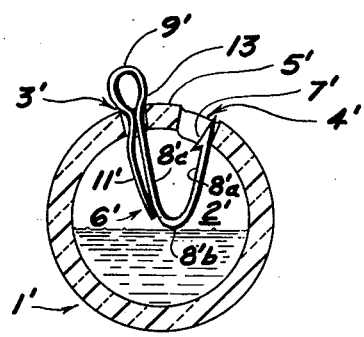
Fig. 4 is a view, taken from an aspect similar to that of Fig. 3, of a modified form of the artificial (salmon-egg) fish lure of the present invention.

In the modified artificial salmon-egg fish lure of Fig. 4, elements similar to the elements of the device of Figs. 1–3 are numbered similarly, but the reference numbers are primed. In this modified form, the recess means 2' is so large that the body means 1' may be said to be a shell. A fish-luring scented material may be placed in the recess means. It should be noted that the fish-hook 6' is in hidden position, and that tip means 7' rests within the second aperture 4'. Retention spring 11' is shaped so as to effectively engage the side of aperture 3'. The fastening and stop means consist of a large open loop to whose top 9' the line may be tied, and which is bent out above shank 8'c and above spring 11' to form collar region 13' which abut, in hidden position, against the outer portions of aperture 3' to prevent the fish-hook 6' from dropping into the recess means 2', whose wall, in this form does not support the shank. Other details of construction are similar to the details of the device of Figs. 1–3. It should be noted that for best contact with the sides of the recess means, in the device of Figs. 1–3, the loop forming retention spring should preferably not be in the plane of the shank (although not so limited), while in the modified device of Fig. 4 this is immaterial, which simplifies the manufacture of the fishhook. Further, the configuration of body means and recess means is less critical in the device of Fig. 4. However, apertures 3' and 4' must be carefully shaped to provide proper positioning retention of the fish-hook 6', which cannot be so firmly held as in the preferred form of Figs. 1–3.

Numerous modifications and variations of the present invention will occur to those skilled in the art after a careful study hereof. All such properly within the basic spirit and scope of the present invention are intended to be included and comprehended herein as fully as if specifically described, illustrated and claimed herein.

For example, while the preferred form of the present invention, as described and illustrated, is imitative of a salmon-egg and the body means is therefore outwardly virtually spherical in shape, thus making the process of manufacturing said form very simple and inexpensive, the present invention is not limited to this specific configuration: the body means may be imitative of any other fish food (e. g., an insect larva, or the like) having a body large enough to allow the recess-aperture hook relationship basic to the present invention.

Also, it should be noted that while the shank means is described as being generally U-shaped, this description should not be taken as restrictive, but rather should be broadly interpreted in the light of the following description. The two arms of the shank need not be of equal length, and indeed usually the second arm is somewhat longer than the first to allow the fastening means to project outside the body means and to provide the proper hook-geometry to set the tip means properly in the fish.

Although the body means has been described as being constructed of synthetic resin, other light materials (such as wood) or combinations of materials may be used.

It should also be noted that the salmon-egg-simulating body means illustrated in the figures may, if desired, be somewhat smaller relative to the size of the fish-hook whereby to provide as large a fish-hook as can be effectively concealed by the body means—or various other relative sizes may be employed.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms having separate first ends and having second ends connected by a connecting portion, pointed tip means carried by the first end of a first one of said arms, and fastening means cooperable for attachment to a fishing line carried by the first end of a second one of said arms; said fish-hook means being placeable in said recess means with said first arm in slidable guiding contact with a portion of said body defining said recess and the first of said apertures and with said second arm in slidable guiding contact with a portion of said body defining said recess and the second of said apertures; retention means cooperating with said fish-hook means and said body means to selectively hidingly retain said fish-hook means within said recess means with said fastening means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; whereby a fish may be lured to swallow said body means, thus, by its subsequent tugging motion and the action of the fisherman, causing the inactivation of said retention means and the exit of the fish-hook means from said body means to engage the mouth of the fish with said tip means.

2. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms having separate first ends and having second ends connected by a connecting portion, pointed tip means carried by the first end of a first one of said arms, and fastening means cooperable for attachment to a fishing line carried by the first end of a second one of said arms; said fish-hook means being placeable in said recess means with said first arm in slidable guiding contact with a portion of said body defining said recess and the first of said aperture and with said second arm in slidable guiding contact with a portion of said body defining said recess and the second of said apertures; retention means cooperating with said fish-hook means and said body means to selectively hidingly retain said fish-hook means within said recess means with said fastening means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; said retention means including spring means cooperable to hold said fish-hook means from emerging prematurely from said recess and stop means serving to position said fish-hook means so that said fastening means may project from said first aperture; whereby a fish may be lured to swallow said body means, thus, by its subsequent tugging motion and the action of the fisherman, causing the inactivation of said retention means and the exit of the fish-hook means from said body means to engage the mouth of the fish with said tip means.

3. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms having separate first ends and having second ends connected by a connecting portion, pointed tip means carried by the first end of a first one of said arms, and fastening means cooperable for attachment to a fishing line carried by the first end of a second one of said arms; said fish-hook means being placeable in said recess means with said first arm in slidable guiding contact with a portion of said body defining said recess and the first of said apertures and with said second arm in slidable guiding contact with a portion of said body defining said recess and the second of said apertures; retention means cooperating with said fish-hook means and said body means to selectively hidingly retain said fish-hook means within said recess means with said fastening means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; said retention means including spring means cooperable to hold said fish-hook means from emerging prematurely from said recess and stop means serving to position said fish-hook means so that said fastening means may project from said first aperture; said fastening means and said spring means comprising a doubled portion of said second arm of said shank means, the loop thus formed serving to springably engage the walls of said recess means, and being constricted at a point spaced from said second arm's first end to define eye means constituting said fastening means; whereby a fish may be lured to swallow said body means, thus, by its subsequent tugging motion and the action of the fisherman, causing the inactivation of said retention means and the exit of the fish-hook means from said body means to engage the mouth of the fish with said tip means.

4. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms having separate first ends and having second ends connected by a connecting portion, pointed tip means carried by the first end of a first one of said arms, and fastening means cooperable for attachment to a fishing line carried by the first end of a second one of said arms; said fish-hook means being placeable in said recess means with said first arm in slidable guiding contact with a portion of said body defining said recess and the first of said apertures and with said second arm in slidable guiding contact with a portion of said body defining said recess and the second of said apertures; retention means cooperating with said fish-hook means and said body means to selectively hidingly retain said fish-hook means within said recess means with said fastening means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures, said retention means including spring means cooperable to hold said fish-hook means from emerging prematurely from said recess and stop means serving to position said fish-hook means so that said fastening means may project from said first aperture; said stop means consisting of a portion of said second arm of said shank means abuttable against the edges of said first aperture to prevent the entrance of said fastening means into said recess means when said fish-hook is hidden in said recess means; whereby a fish may be lured to swallow said body means, thus, by its subsequent tugging motion and the action of the fisherman, causing the inactivation of said retention means and the exit of the fish-hook means from said body means to engage the mouth of the fish with said tip means.

5. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms having separate first ends and having second ends connected by a connecting portion, pointed tip means carried by the first end of a first one of said arms, and fastening means cooperable for attachment to a fishing line carried by the first end of a second one of said arms; said fish-hook means being placeable in said recess means with said first arm in slidable guiding contact with a portion of said body defining said recess and the first of said apertures and with said second arm in slidable guiding contact with a portion of said body defining said recess and the second of said apertures; retention means cooperating with said fish-hook means and said body means to selectively hidingly retain said fish-hook means within said recess means with said fastening means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; said retention means including spring means cooperable to hold said fish-hook means from emerging prematurely from said recess and stop means serving to position said fish-hook means so that said fastening means may project from said first aperture; said fastening means and said spring means comprising a doubled portion of said second arm of said shank means, the loop thus formed serving to springably engage the walls of said recess means, and being constricted at a point spaced from said second arm's first end to define eye means constituting said fastening means; said stop means consisting of a portion of the wall of said recess means against which said shank means is abuttable when said fish-hook is hidden in said recess means; said body means being so colored, shaped, and scented as to imitate a salmon egg; whereby a fish may be lured to swallow said body means, thus, by its subsequent tugging motion and the action of the fisherman, causing the inactivation of said retention means and the exit of the fish-hook means from said body means to engage the mouth of the fish with said tip means.

6. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms of unequal length having separate upper ends and having lower ends connected by a connecting portion, barbed pointed generally upwardly directed fish-hook tip means carried by the upper end of the shorter of the two arms, and eye means cooperable for attachment to a fishing line carried by the upper end of the longer of the two arms; said fish-hook means being placeable in said recess means with said first arm in slidable guiding contact with a portion of said body defining said recess and the first of said apertures and with said fish-hook tip means in slidable guiding contact with a portion of said body defining said recess and the second of said apertures; retention means cooperating with said fish-hook means and said body means selectively hidingly retain said fish-hook means within said recess means with said eye means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; said retention means including spring means cooperable to hold said fish-hook means from emerging prematurely from said recess and stop means serving to position said fish-hook means so that said eye means may project from said first aperture; said eye means and said spring means comprising a doubled portion of said longer arm, said doubled portion being cooperable to springably engage the walls of said recess means, said doubled portion defining said eye means at the upper end of said longer arm; said stop means consisting of a portion of the wall of said recess means against which said shank means is abuttable when said fish-hook is hidden in said recess means; whereby a fish may be lured to swallow said body means, thus, by its subsequent tugging motion and the action of the fisherman, causing the inactivation of said retention means and the exit of the fish-hook means from said body means to engage the mouth of the fish with said tip means.

7. In an artificial fish lure suitable for casting on a fishing line, the combination of: light-weight body means imitative of a natural fish food, said body means defining internal recess means and two spaced apertures in the external surface of said body means at the top only thereof communicating downwardly with said recess means; fish-hook means including generally U-shaped shank means comprising two arms of unequal length having separate upper ends and having lower ends connected by a connecting portion, barbed pointed generally upwardly directed fish-hook tip means carried by the upper end of the shorter of the two arms, and eye means cooperable for attachment to a fishing line carried by the upper end of the longer of the two arms; said fish-hook means being placeable in said recess means with said first arm in slidable guiding contact with a portion of said body defining said recess and the first of said apertures and with said fish-hook tip means in slidable guiding contact with a portion of said body defining said recess and the second of said apertures; retention means cooperating with said fish-hook means and said body means to selectively hidingly retain said fish-hook means within said recess means with said eye means projecting from a first of said apertures, and selectively permit the exit of the major part of said fish-hook means from said recess when said line receives a sharp pull, said tip means emerging through the second of said apertures and said shank means being retentively engaged by the portion of said body means between said apertures; said retention means including spring means cooperable to hold said fish-hook means from emerging prematurely from said recess and stop means serving to position said fish-hook means so that said eye means may project from said first aperture; said eye means and said spring means comprising a doubled portion of said longer arm, said doubled portion being cooperable to springably engage portions of said body defining said first aperture, said doubled portion defining said eye means at the upper end of said longer arm; said stop means consisting of a portion of said second arm of said shank means abuttable against the edges of said first aperture to prevent the entrance of said eye means into said recess means when said fish-hook is hidden in said recess means; said body means being so colored, shaped, and scented as to imitate a salmon egg; whereby a fish may be lured to swallow said body means, thus, by its subsequent tugging motion and the action of the fisherman, causing the inactivation of said retention means and the exit of the fish-hook means from said body means to engage the mouth of the fish with said tip means.

References Cited in the file of this patent

UNITED STATES PATENTS

| | | |
|---|---|---|
| 196,648 | Edgar | Oct. 30, 1877 |
| 913,102 | Burke | Feb. 29, 1909 |
| 1,922,841 | Cooley | Aug. 15, 1933 |
| 2,600,673 | Murray | June 17, 1954 |